(12) United States Patent
Cieslinski

(10) Patent No.: US 7,952,629 B2
(45) Date of Patent: May 31, 2011

(54) IMAGE SENSOR

(75) Inventor: Michael Cieslinski, Unterhaching (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 381 days.

(21) Appl. No.: 12/235,808

(22) Filed: Sep. 23, 2008

(65) Prior Publication Data

US 2010/0073538 A1    Mar. 25, 2010

(30) Foreign Application Priority Data

Sep. 24, 2007   (DE) .......................... 10 2007 045 448

(51) Int. Cl.
*H04N 5/335*  (2006.01)
*H04N 3/14*   (2006.01)

(52) U.S. Cl. ........ 348/294; 348/297; 348/298; 348/302; 348/308

(58) Field of Classification Search .................. 348/294, 348/297, 298, 302, 308, 312; 250/208.1; 257/290–292
See application file for complete search history.

(56) References Cited

U.S. PATENT DOCUMENTS

| | | | |
|---|---|---|---|
| 3,983,395 A | 9/1976 | Kim | |
| 5,309,243 A | 5/1994 | Tsai | |
| 5,894,527 A | 4/1999 | Endo et al. | |
| 6,115,065 A | 9/2000 | Yadid-Pecht et al. | |
| 6,133,862 A | 10/2000 | Dhuse et al. | |
| 6,710,804 B1 | 3/2004 | Guidash | |
| 6,922,209 B1 | 7/2005 | Hwang et al. | |
| 7,324,144 B1 * | 1/2008 | Koizumi | 348/294 |
| 2002/0000508 A1 | 1/2002 | Muramatsu et al. | |
| 2003/0210345 A1 | 11/2003 | Nakamura et al. | |
| 2005/0052554 A1 | 3/2005 | Sakurai et al. | |
| 2006/0158542 A1 | 7/2006 | Mizuno et al. | |

(Continued)

FOREIGN PATENT DOCUMENTS

DE    199 29 733 A1    1/2000

(Continued)

OTHER PUBLICATIONS

German Search Report dated Jun. 23, 2008. German Patent Application No. DE 10 2007 045 448.3.

*Primary Examiner* — Yogesh K Aggarwal
(74) *Attorney, Agent, or Firm* — Gifford, Krass, Sprinkle, Anderson & Citkowski, P.C.

(57) ABSTRACT

The invention relates to an image sensor for cameras which includes a plurality of pixels arranged in lines and columns. The pixels each include a light-sensitive detector element to generate electrical charge from incident light, a transfer gate, a readout node which is charge-coupled to the detector element via the transfer gate, a converter circuit to generate a measurement signal which is proportional to a charge present in the readout node, and a reset device to reset a charge present in the readout node to a reference value. The image sensor furthermore includes a control device for the control of the transfer gate and of the of the reset device of the respective pixel. The control device is configured such that the charge generated during a single exposure procedure in the respective detector element is transferred from the detector element to the readout node in a plurality of portions. The invention furthermore relates to a method for the reading out of an image sensor.

26 Claims, 7 Drawing Sheets

U.S. PATENT DOCUMENTS

| | | |
|---|---|---|
| 2006/0209204 A1 | 9/2006 | Ward |
| 2007/0002164 A1 | 1/2007 | Ward et al. |
| 2007/0007559 A1 | 1/2007 | Lee et al. |
| 2007/0138375 A1 | 6/2007 | Lee et al. |

FOREIGN PATENT DOCUMENTS

| | | |
|---|---|---|
| DE | 199 07 971 A1 | 8/2000 |
| EP | 0 492 597 A2 | 7/1992 |
| EP | 0 903 935 A1 | 3/1999 |
| EP | 1 078 390 B1 | 2/2001 |
| EP | 1 235 277 A2 | 8/2002 |
| EP | 1 339 227 A2 | 8/2003 |
| EP | 1 681 850 A1 | 7/2006 |
| JP | 0 1251756 | 10/1989 |
| JP | 02122668 A | 5/1990 |
| JP | 2004229257 A | 8/2004 |
| JP | 2004254151 A | 9/2004 |
| WO | WO-2006/082186 | 8/2006 |
| WO | WO-2007/017835 | 2/2007 |
| WO | WO-2007/027590 A2 | 3/2007 |
| WO | WO-2007/038977 | 4/2007 |

* cited by examiner

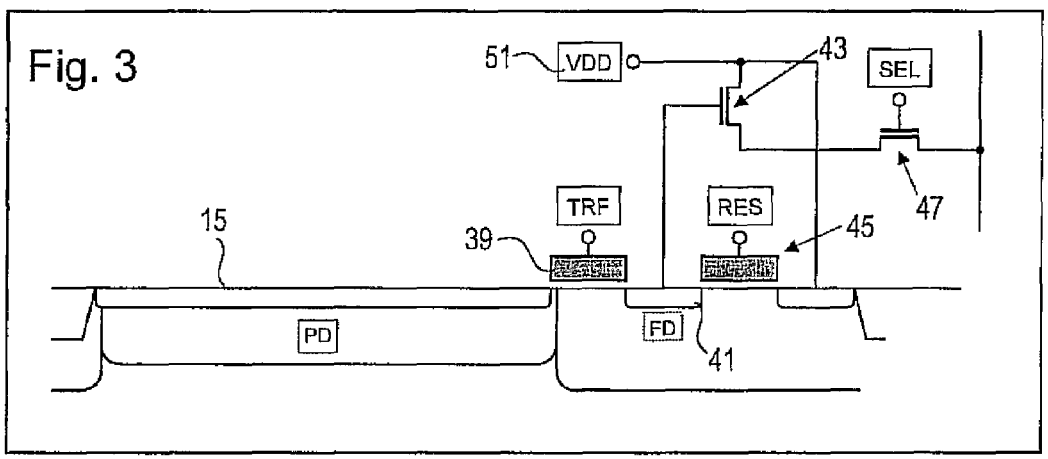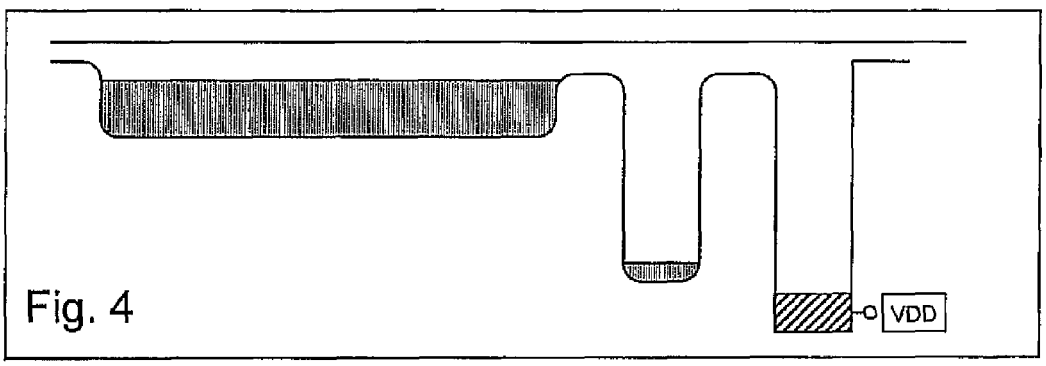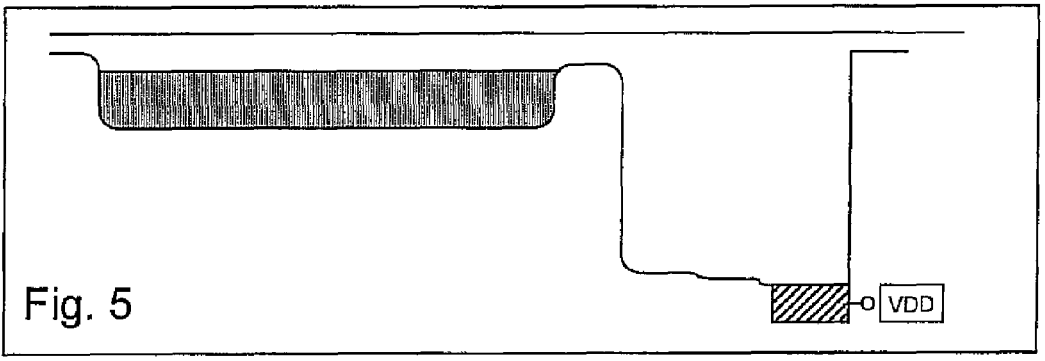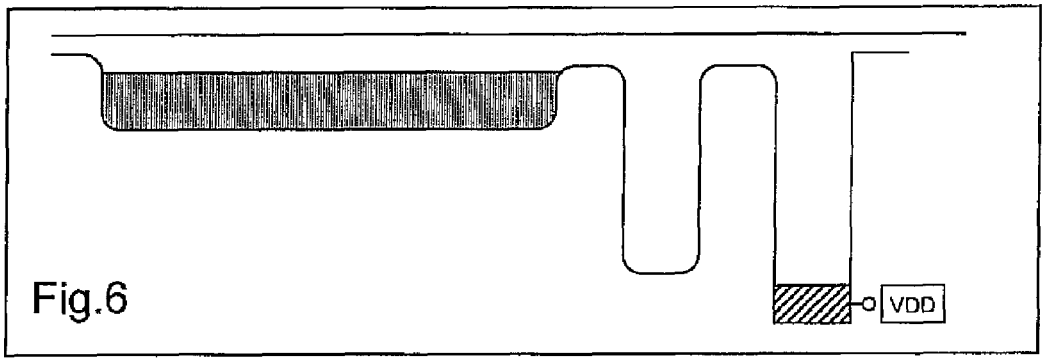

IMAGE SENSOR

RELATED APPLICATION

This application claims priority of German Patent Application 10 2007 045 448.3 filed Sep. 24, 2007.

The present invention relates to an image sensor, in particular a CMOS image sensor, for electronic cameras. The image sensor includes a plurality of pixels arranged in lines and columns. The pixels each include a light-sensitive detector element to generate electrical charge from incident light, a transfer gate, a readout node which is charge-coupled to the detector element via the transfer gate, a converter circuit to generate a measurement signal which is proportional to a charge present in the readout node, and a reset device to reset a charge present in the readout node to a reference value. The image sensor furthermore includes a control device for the control of the transfer gate and of the reset device of the respective pixel. The present invention furthermore relates to a method for the reading out of an image sensor, in particular of a CMOS image sensor, for electronic cameras.

An electronic camera is used, for example, to digitally record image sequences which are later shown in a cinema. It is advantageous in this respect if such a camera has high light sensitivity and simultaneously a high dynamic range. These two properties are decisive for the quality of the recording and they help to reduce the costs for the illumination of the scene, for example.

The image sensor of such a camera in this respect converts light incident through the lens of the camera into electrical signals. For this purpose, the image sensor includes a plurality of light-sensitive elements, the so-called pixels. The incident light is converted into electrical charge in the pixels. To read out an image taken by the camera, the pixels are addressed in order, for example, and a voltage proportional to the charge of the respective pixel is generated which is guided to an output of the image sensor.

Figure 1:
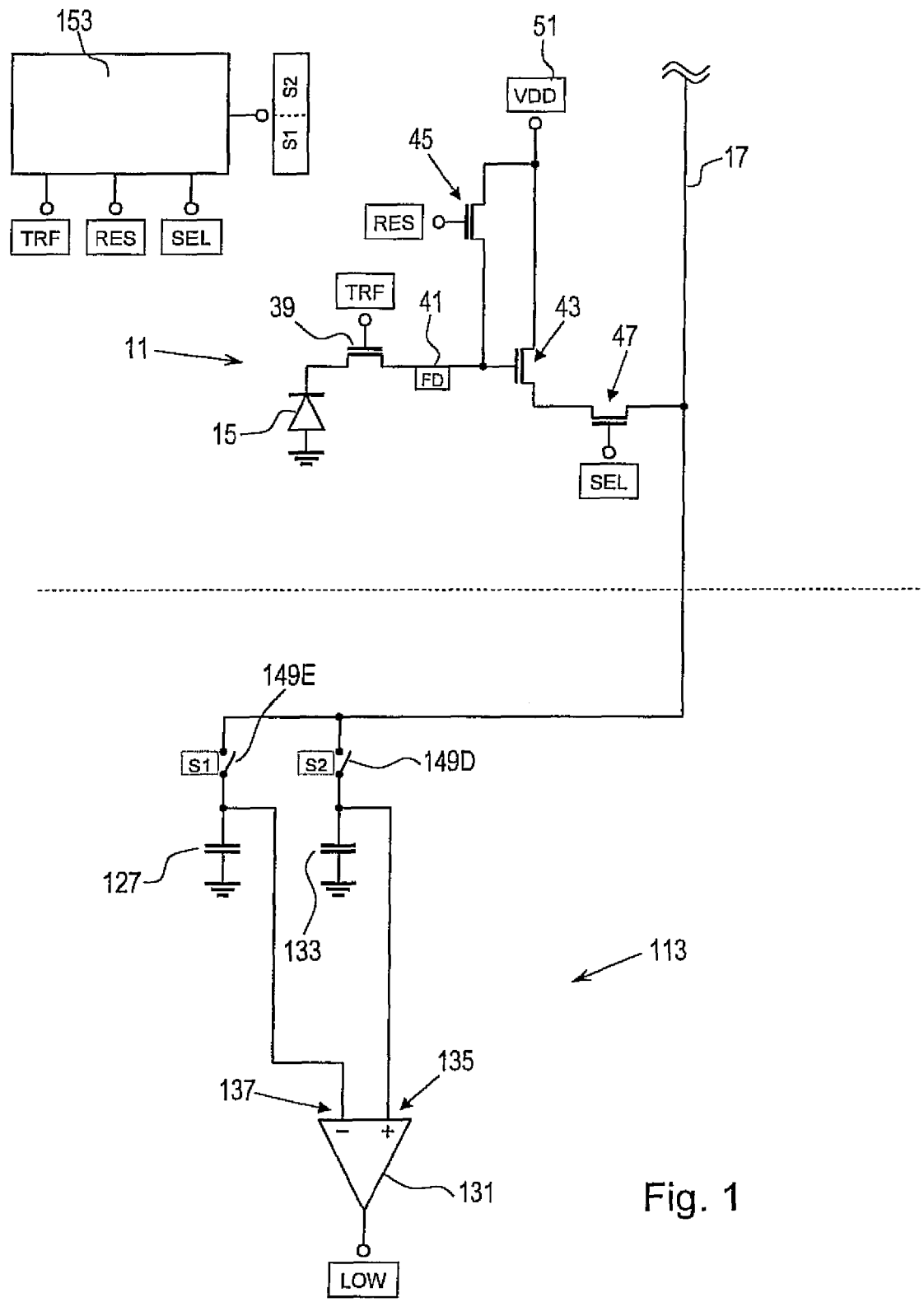

An image sensor of the initially named kind can be made, for example, as shown in FIG. 1 in which only one single pixel 11 is shown as a representative. The pixel 11 shown includes a light-sensitive detector element in the form of a so-called pinned diode (PD) 15 which is charge coupled via a transfer gate 39 to a readout node 41 which is made as a so-called floating diffusion (FD). The readout node 41 is connected to the gate of a converter field effect transistor (FET) 43 which is made as a source follower and which represents a charge voltage converter circuit. Furthermore the readout node 41 is connected via a reset FET 45 to a positive voltage supply 51. One of the two channel connections of the converter FET 43 is likewise connected to the positive supply 51, whereas the other of the two channel connections of the converter FET 43 is connectable via a selection FET 47 which acts as a line selection switch to the column path 17 associated with the pixel shown.

The column path 17 is provided to connect the pixels arranged in the associated column, in particular pixels 11, to a common column amplifier circuit 113. The column amplifier circuit 113 includes a first capacitor 127 which is connected to a connection to ground and is connectable to the other connection via a switch 149E selectively to the column path 17. The column amplifier circuit 113 furthermore includes a second capacitor 133 which is likewise connected to a connection to ground and is connectable to the other connection via a further switch 149D likewise selectively to the column path 17. The column amplifier circuit 113 furthermore includes an amplifier 131 at whose negative input 137 the voltage applied to the first capacitor 127 is input and at whose positive input 135 the voltage applied to the second capacitor 133 is input.

The transfer gate 39 is controllable via a control line TRF; the reset FET 45 is controllable via a control line RES; the selection FET 47 is controllable via a control line SEL; the switch 149E is controllable via a control line 131; and the switch 149D is connectable via a control line 32, in each case by a common control device 153 of the image sensor.

The operation of such a pixel 11 will be described in the following by way of example based on a 3.3V CMOS technology.

First, the light incident during an exposure procedure is converted by the pinned diode 15 into electrical charge so that the pinned diode 15 fills with electrons. During the exposure, the control lines TRF, RES and SEL are each maintained at 0V, i.e. the switches 39, 45, 47 controlled hereby are open.

For the reading out, in a first step (Reset 1), a voltage of 3.3V is briefly applied to the control line RES to remove a charge formed by leakage currents and/or scattered light from the readout nodes 41.

In a second step (reading the reference value), a voltage of 3.3V is applied to the control line SEL (closing of the switch 47) and the switch 149E is closed. The voltage level of the readout node 41 is thereby switched via the converter FET 43 and the selection FET 47 to the column path 17 and is thus guided to the capacitor 127. After the system has undergone transient oscillation, the capacitor 127 is separated from the pixel 11 again by opening the switch 149E.

Subsequently, in a third step (transfer of the charge), a voltage of 3.3V is briefly applied to the control line TRF so that the electrons can flow from the pinned diode 15 to the readout node 41.

Then, in a fourth step (reading of the signal), the switch 149D is closed. The voltage level of the readout node 41 is thereby switched via the converter FET 43 and the selection FET 47 to the column path 17 and is thus guided to the capacitor 133. After the transient oscillation of the system, the capacitor 133 is again separated from the pixel 11 by opening the switch 149D and the control line SEL is again set to 0V.

Finally, in a fifth step (Reset 2), a voltage of 3.3V is briefly applied to the control lines RES and TRF to remove the charge from the readout node 41 and possible residual charges from the pinned diode 15 so that the next exposure procedure can start again with a completely "empty" pixel.

A voltage is now applied to the output of the amplifier 131 which corresponds to the charge amount generated by the exposure procedure in the pinned diode 15.

To ensure high light sensitivity in the image sensor described with reference to FIG. 1, it is necessary that the charges generated in the pinned diode 15 by the incident light effect a high voltage at the gate of the converter FET 43. This is achieved in that the capacity of the readout node 41 is kept small. With a capacity of, for example, 2 fF, each electron effects a voltage change of 80 µV. If the camera has a noise level of e.g. 240 µV, 3 electrons or 3 photons are thus already detectable.

The image sensor described with reference to FIG. 1 thus admittedly has high light sensitivity, but only a low dynamic range. With the aforesaid capacity of 2 fF, the read out node 41 is already completely filled with 12,000 electrons. 12,000 electrons effect a voltage of approximately 1V, whereby the limit of the electrical range is reached which can be forwarded to the outputs.

A maximum achievable dynamic ratio of 4000:1 thereby results. A photographic film, in contrast, has a dynamic ratio of more than 10,000:1.

It is known in order to increase the dynamic range to combine at least two shots which have different exposure times, with the shots being taken sequentially. This is, however, not possible with moving objects due to the time offset of the shots to be combined.

It is the underlying object of the invention to provide a possibility also to ensure a high dynamic range in addition to high light sensitivity in an image sensor or in a method of the initially named kind.

This object is satisfied by an image sensor having the features of claim 1 and in particular in that the control device is configured such that the charge generated during a single exposure procedure in the respective detector element is transferred from the detector element to the readout node in a plurality of portions.

This object is furthermore satisfied by a method having the features of claim 18 and in particular in that the charge generated during a single exposure procedure in the respective detector element is transferred from the detector element to the readout node in a plurality of portions.

It is therefore possible in accordance with the invention to read out the charge generated in the detector element based on a single exposure procedure in a plurality of portions. The dynamic ratio of the image sensor can be increased thanks to the step-wise reading out with respect to the dynamic ratio known from the prior art by a factor corresponding to the number of charge transfers. If the charge generated in the detector element based on, for example, three charge transfers is read out, the dynamic ratio can be increased by the factor three. If the readout node has a saturation limit of, for example, 12,000 electrons and if the detector element has a saturation limit of 36,000 electrons, a dynamic ratio of 12,000:1 is achieved with a noise level of three electrons. If the detector element has an even higher saturation limit, the dynamic ratio can be increased even further by a reading out divided more than threefold. Since the capacity of the readout node can be selected to be small in this connection (in relation to the capacity of the detector element), high light sensitivity is maintained.

Switchable capacities for the pixels can thus be dispensed with in the image sensor in accordance with the invention and in the method in accordance with the invention. Such switchable capacities admittedly increase the dynamic range, but they reduce the light sensitivity since the space required by the respective capacity, a respective additional transistor for the capacity and an additional control line is no longer available for the respective detector element. In addition, unwanted calibration operations are required with such switchable capacities.

It is important in connection with the invention that that charge is divided into a plurality of part charges (or part value measurement signals) which has been generated on the basis of a single exposure procedure in the respective detector element, with a mechanical or an electronic shutter initiating or ending the exposure procedure, for example. The image sensor is hereby in particular also suitable for the recording of moving motifs. The output signal of the image sensor is namely not generated from a plurality of part value measurement signals corresponding to different exposure times, which could result in a "smearing" of the image information.

The term "charge coupling" is to be understood such that a charge present in the detector element can be moved into the readout node. The charge present in the readout node can in particular be a zero charge, i.e. a charge is no longer present in the readout node after the resetting by the reset device. This in particular applies to the named reference value.

In accordance with an embodiment of the invention, the control device is configured such that at least two sequential transfer control signals are applied to the transfer gate for the reading out of the charge generated during a single exposure procedure in the respective detector element so that a respective charge transfer from the detector element to the readout node is made possible in order to generate a separate part value measurement signal for each charge transfer by means of the converter circuit, said part value measurement signal being proportional to the charge present in the readout node on the basis of the respective charge transfer. The reset device is preferably activated between the respective sequential transfer control signals.

At least two of the transfer control signals preferably have different control values. The absolute value of the control value of the later of the two transfer control signals can in particular be larger than the absolute value of the control value of the earlier of the two transfer control signals. With a CMOS image sensor, for example, the at least two transfer control signals can have different control voltage values. This in particular means that not each of the control voltage values has to correspond to the full operating voltage underlying the respective technology generation. The power consumption of the image sensor can hereby be reduced. By a transfer control signal whose control value is larger in amount than the control value amount of another transfer control signal, the transfer of those charges which cannot (yet) be transferred by the other transfer control signal (lower in amount) is above all made possible. Part value measurement signals which correspond to a zero charge can also be generated by a gradation of the control values of the transfer control signals with a non-saturated detector element.

The detector element can include precisely two connections, with the one connection being coupled to a predetermined reference potential (e.g. ground) and other connection only being coupled to the transfer gate, i.e. the charge generated in the detector element can be transferred (via the transfer gate) directly to the readout node without a further switch or a bias voltage of the detector element.

The detector element can in particular be made as a photodiode, preferably as a pinned diode, whose potential level is fixed.

The readout node can be made as a floating diffusion whose potential level varies with the charge amount present in the charge node.

In accordance with an embodiment of the invention, the pixels arranged in a respective column are connected via a common column path to a column amplifier circuit which is controllable by the control device and which includes an amplifier and a number of part value signal memories corresponding to the number of sequential transfer control signals, with the control device being made such that each of the part value measurement signals corresponding to the charge transfers is transferred to a respective one of the part value signal memories. The part value measurement signals are preferably only combined and digitized after their storage in the part value signal memories. The combined signal or total value measurement signal can then also be smaller than one or more of the part value measurement signals—since, on the reading out, all the part value signal memories are switched to a common input of the respective amplifier or A/D converter (adding up of the capacities of the part value signal memories). It is, however, generally also possible that first each of the part value measurement signals is individually digitized and is stored as a digital value in the respective part value signal memory, with the digital values subsequently being combined.

For example, two, three or more part value signal memories can be provided. The part value signal memories can have identical capacities and/or be made in integrated form.

In accordance with a further embodiment of the invention, the respective column amplifier circuit includes first switch means, with the part value signal memories being connectable via the first switch means simultaneously to a first input of the amplifier. The part value measurement signals can hereby be combined in a simple manner to generate the total value measurement signal described above and proportional to the charge generated in the detector element.

The control device can in particular be made such that a reference value measurement signal corresponding to the reference value of the charge is generated by means of the converter circuit after an activation of the reset device and is transferred to a reference value signal memory of the respective column amplifier circuit, with the reference value signal memory being connected or connectable to a second input of the amplifier. The reference value measurement signal corresponds to a defined charge in the readout node, in particular to a zero charge. The reference value measurement signal can generally be generated before or after the generation of any desired one of the part value measurement signals.

In accordance with another embodiment of the invention, the respective column amplifier circuit includes an additional amplifier and a residual value signal memory, with the control device being made such that one of the part value measurement signals corresponding to the charge transfer is simultaneously transferred to the associated part value signal memory and to the residual value signal memory. The part value measurement signal present in the residual value signal memory can then be compared with the total value measurement signal described above. Depending on the result of this comparison, the part value measurement signal present in the residual value signal memory, the total value measurement signal or a combination of these two signals can be used for the determination of the charge generated in the detector element.

The aforesaid at least one part value measurement signal is in particular that measurement signal corresponding to the last charge transfer. If it is found that charge also actually has only been transferred from the detector element to the readout node on the last charge transfer, only the part value measurement signal stored in the residual value signal memory can be used for the determination of the charge generated in the detector element, whereby the signal-to-noise ratio is improved with respect to the use of the total value measurement signal described above.

The respective residual value signal memory is preferably connected or connectable to a first input of the additional amplifier and/or the reference value signal memory described above is connected to connectable to a second input of the additional amplifier.

It is advantageous if the additional amplifier (associated with the residual value signal memory) has a higher amplification factor than the named amplifier (associated with the part value signal memories), with a correspondingly adapted transition being able to be provided to selectively use the part value measurement signal present in the residual value signal memory, the total value measurement signal or a combination of these two signals for the determination of the charge generated in the detector element. The signal path with the lower amplification factor (for the total value measurement signal) in this connection enables the full level control, whereas an improved signal-to-nose ratio results for the signal path with the higher amplification factor (for the signal of the residual value signal memory) with respect to the nose and to the interference of all stages which are provided after the respective amplification. An even higher dynamic ratio is thus achieved by a combination of these two channels.

In order selectively to connect the column path to one or more of the signal memories, the respective column amplification circuit includes second switch means. A separate switch is preferably provided between the column path and each of the signal memories.

The signal memories, i.e. the part value signal memories, the reference value signal memory described above and the residual value signal memory, are preferably each made as a capacitor.

In accordance with another embodiment of the invention, the image sensor is made such that the part value measurement signals corresponding to the charge transfers of a single exposure procedure are individually digitized and the digitized part value measurement signals are subsequently combined to form a digital total value measurement signal. A separate A/D converter can be provided for each column, for example, or a common A/D converter can be provided for all columns.

In particular precisely one analog signal memory can be provided for each column, with the control device being made such that each of the part value measurement signals corresponding to the charge transfers or additionally also at least one reference value measurement signal is transferred to the analog signal memory to be respectively digitized thereafter.

Non-restricting embodiments of the invention are shown in the drawing and will be described in the following.

Figure 2:
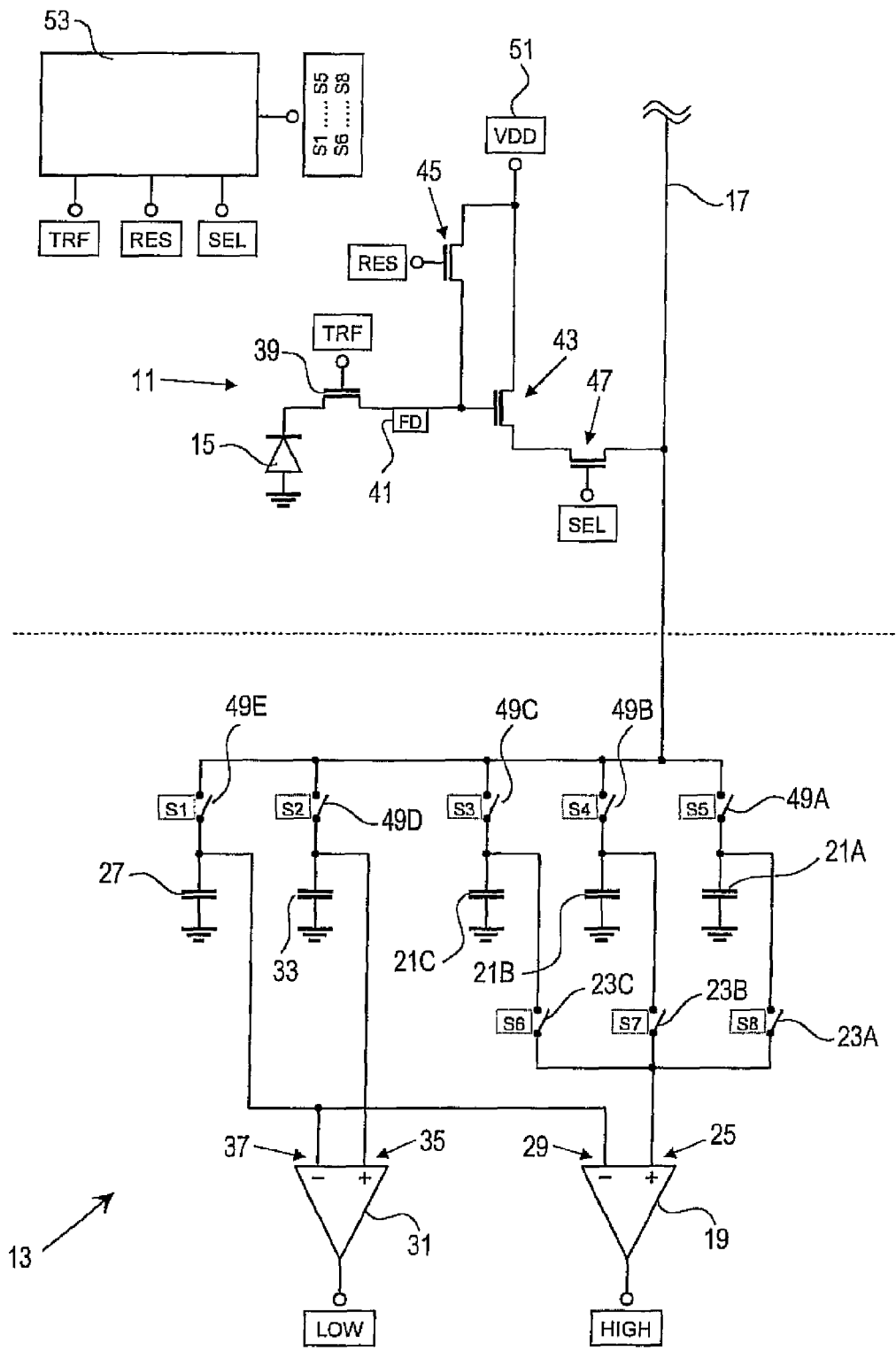
Figure 18:
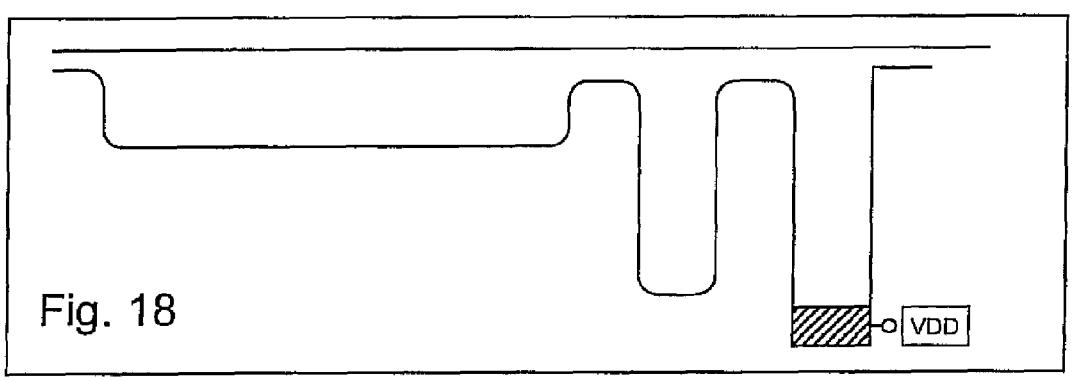
Figure 19:
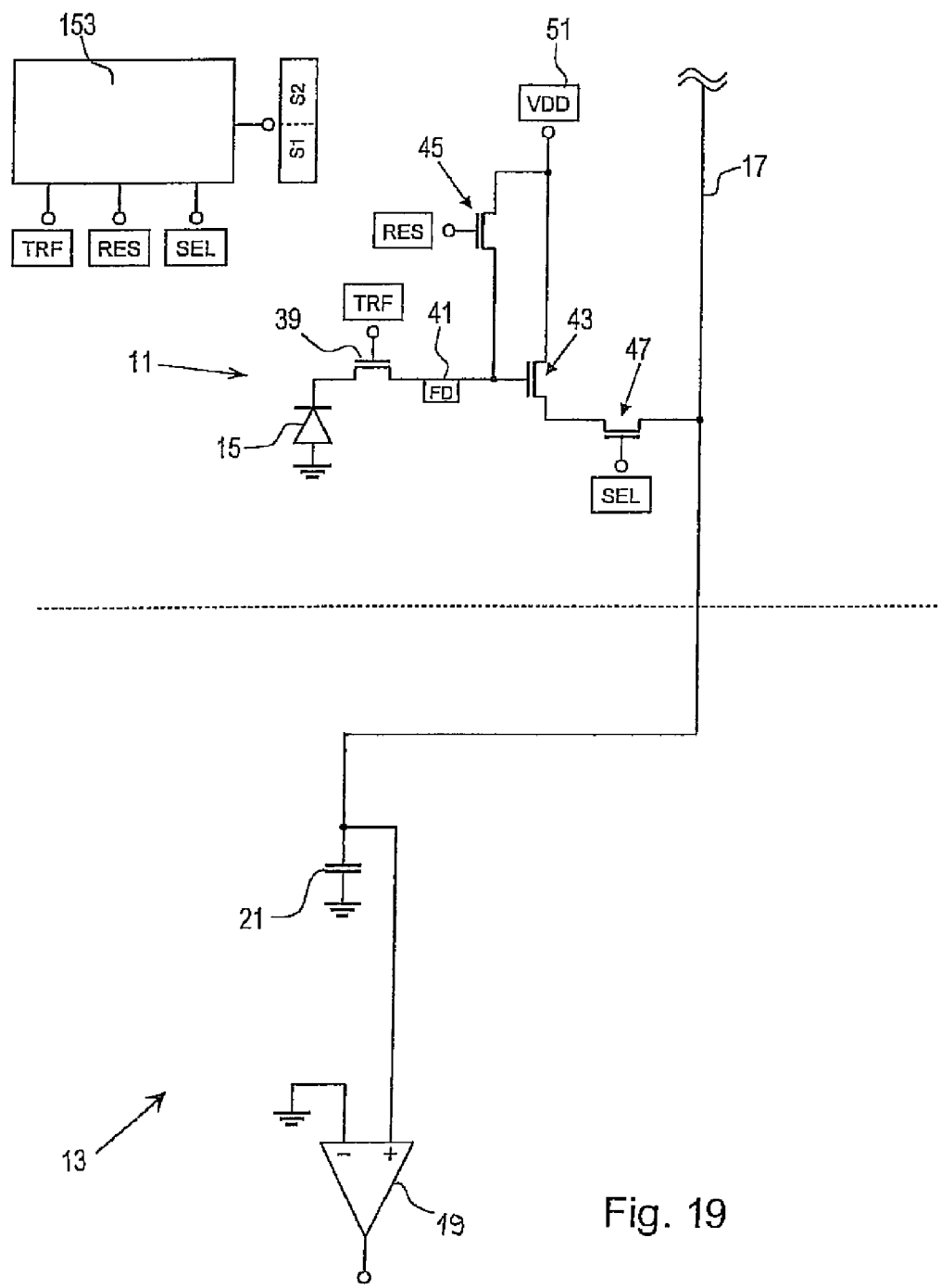

There are shown, schematically in each case:

FIG. 1 a 4-transistor CMOS image sensor in accordance with the prior art, with only one pixel of the image sensor and a column amplifier circuit being shown;

FIG. 2 a 4-transistor CMOS image sensor in accordance with the present invention in a representation analog to FIG. 1;

FIG. 3 a part cross-section through the pixel of FIG. 2;

FIGS. 4 to 18 potential diagrams relating to the cross-section shown in FIG. 3 at different times during the reading out of the pixel; and FIG. 19 a further 4-transfer CMOS image sensor in accordance with the present invention in a representation analog to FIG. 1.

The image sensor in accordance with the invention shown in FIG. 2 includes a pixel 11 and a column path 17 corresponding to the pixel 11 described with respect to the prior art in FIG. 1 and to the column path 17 described with respect to the prior art in FIG. 1 respectively. Furthermore, the image sensor in accordance with FIG. 2 includes an amplifier circuit 13 which includes an amplifier 31 (with a positive input 35 and a negative input 37) which corresponds to the amplifier 131 from FIG. 1 and which is called an additional amplifier 31 in the following; a residual value capacitor 33 corresponding to the capacitor 133 from FIG. 1; a reference value capacitor 27 corresponding to the capacitor 127 from FIG. 1; a switch 49E corresponding to the switch 149E from FIG. 1; and a switch 49D corresponding to the switch 149D from FIG. 1. The above components are connected to one another in the same manner as the corresponding components of FIG. 1. The above statements on FIG. 1 therefore also form part of the disclosure of the invention.

The image sensor in accordance with FIG. 2 furthermore includes three part value capacitors 21A, 21B, 21C which are connected parallel to one another and to ground in each case, which are identical and which are connectable to the column path 17 via their own switch 49A, 49B, 49C which are in each case called second switches 49A, 49B, 49C in the following.

Furthermore, a further switch 23A, 23B, 23C is provided for each part value capacitor, with the further switches 23A, 23B, 23C each being called first switches 23A, 23B, 23C in the following. The three part value capacitors 21A, 21B, 21C are connectable to one another via the first switches 23A, 23B, 23C and are simultaneously connectable to the positive input 25 of an amplifier 19. The negative input 29 of the amplifier 19 is connected to the reference value capacitor 27.

In addition, the image sensor in accordance with FIG. 2 includes a control device 53 which corresponds to the control device 153 from FIG. 1 and which also controls, in addition to the components already described with reference to FIG. 1, the first switches 23A, 23B, 23C and the second switches 49A, 49B, 49C (via the control lines S3, S4, S5, S6, S7, S8).

FIG. 3 shows a semiconductor substrate in which the pinned diode 15 is provided which is charge coupled via a transfer gate 39 to the readout node 41 made as a floating diffusion. The readout node 41 is connectable via the reset FET 45 to a diffused channel connection to which the positive supply 51 is applied.

In the following, the functionality of the pixel 11 of the image sensor in accordance with the invention of FIGS. 2 and 3 will be described with reference to FIGS. 4 to 18 by way of example based on a 3.3V CMOS technology, with the charge generated in the pinned diode 15 being read out in three charge transfer steps. Alternatively, the readout procedure can, however, also take place in two steps or in more than three steps.

After a single, uninterrupted exposure procedure, the pinned diode 15 or its potential well is filled with charge, as is shown in FIG. 4 (after the exposure, directly before the reading out). The readout node 41 or its potential well likewise contains a small amount of charge which was generated by leakage currents and/or scattered light.

A voltage of 3.3 v is first applied to the control line RES for the reading out. As is shown in FIG. 5 (Reset 1), the charge generated in the pinned diode 15 can thereby flow off out of the readout node 41 to the positive supply voltage 51. The control line RES is then again set to 0V (FIG. 6, end of Reset 1). It is hereby ensured that the readout node 41 does not already contain charge before a first charge transfer such as will be described in the following.

Figure 7:
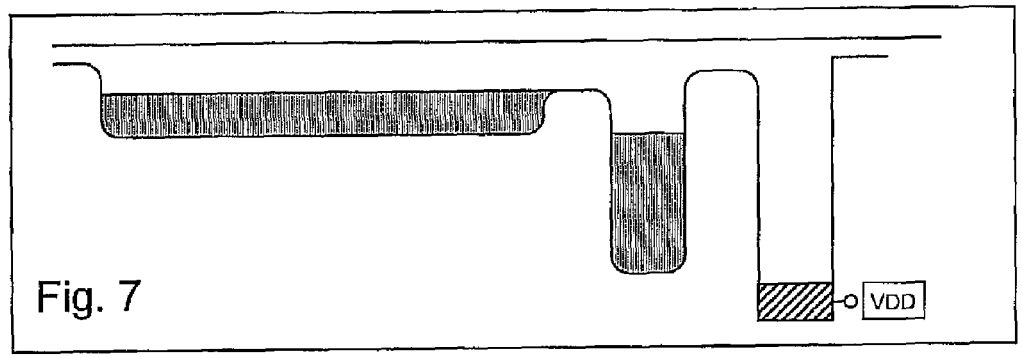
Figure 8:
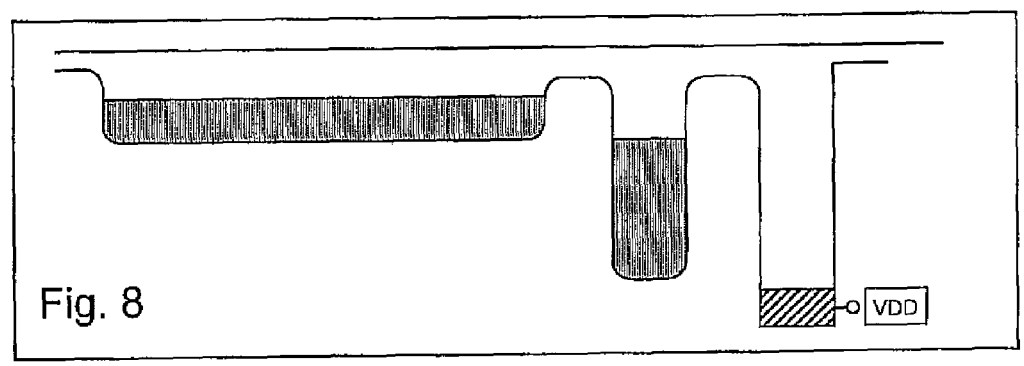

In accordance with FIG. 7 (Transfer 1), a mean voltage of 2.57 is applied by means of a first transfer control signal to the control line TRF so that a first portion of the charge generated in the pinned diode 15 can flow into the readout node 41. Subsequently, the control line TRF is again set to 0V so that now the first portion of the charge is located in the readout node 41 (FIG. 8, end of Transfer 1).

Then the control line SEL is set to a voltage of 3.3V and the second switch 49A is closed. The voltage level generated by the charge in the readout node 41 via the converter FET 43 is thereby switched to the column path 17 via the selection FET 47 and is thus guided to the part value capacitor 21A (Read Signal 1). After the system has undergone transient oscillation, the part value capacitor 21A is again separated from the pixel 11 by opening the second switch 49A so that an analog first part value voltage signal is ultimately stored in the part value capacitor 21A in the form of a corresponding charge, said part value voltage signal being proportional to the charge present in the readout node 41 after the first charge transfer.

Figure 9:
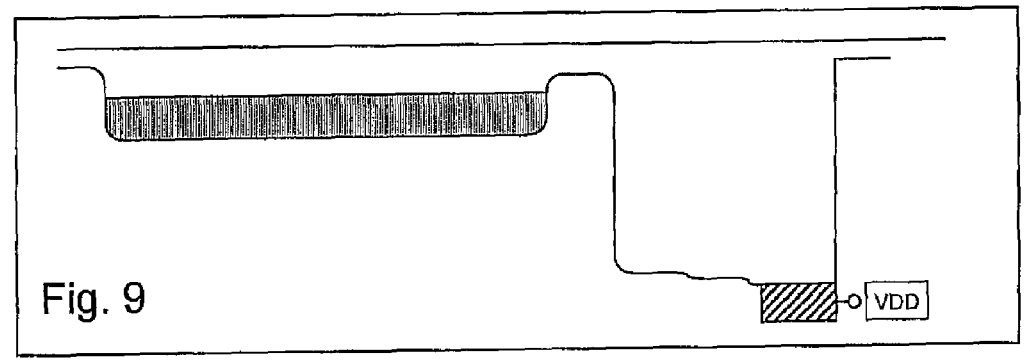
Figure 10:
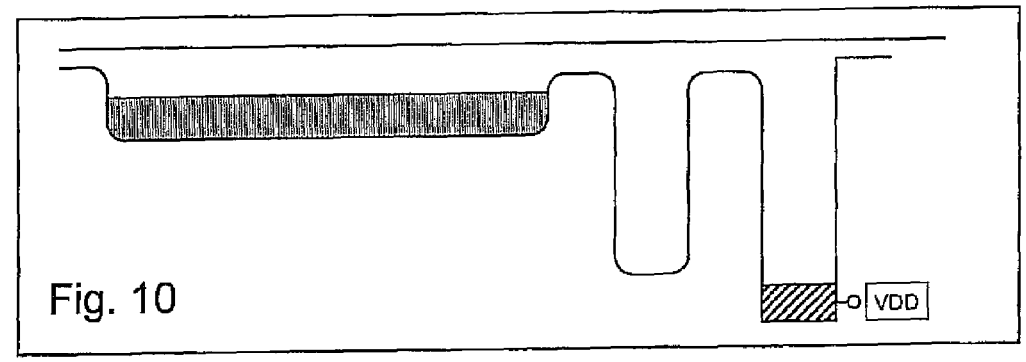

Now the control line RES is set to a voltage of 3.3V so that the charge can flow off from the readout node 41 to the positive supply 51 (FIG. 9, Reset 2). The control line RES is then again set to 0V (FIG. 10, end of Reset 2). It is hereby in turn ensured that the readout node 41 does not already contain charge before a second charge transfer such as will be described in the following.

Figure 11:
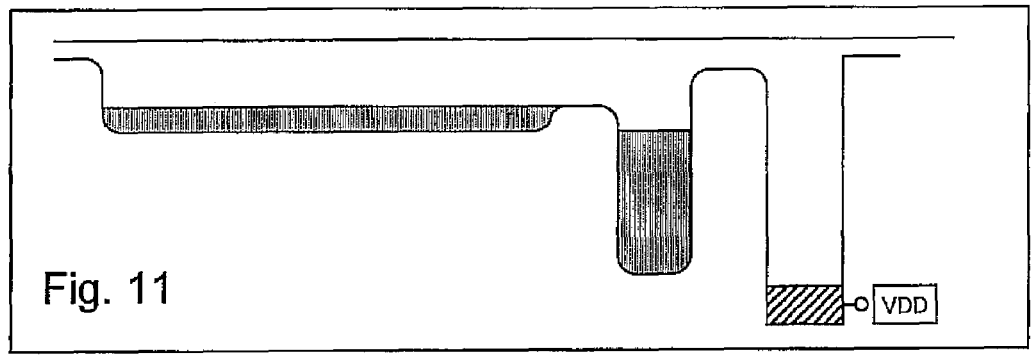
Figure 12:
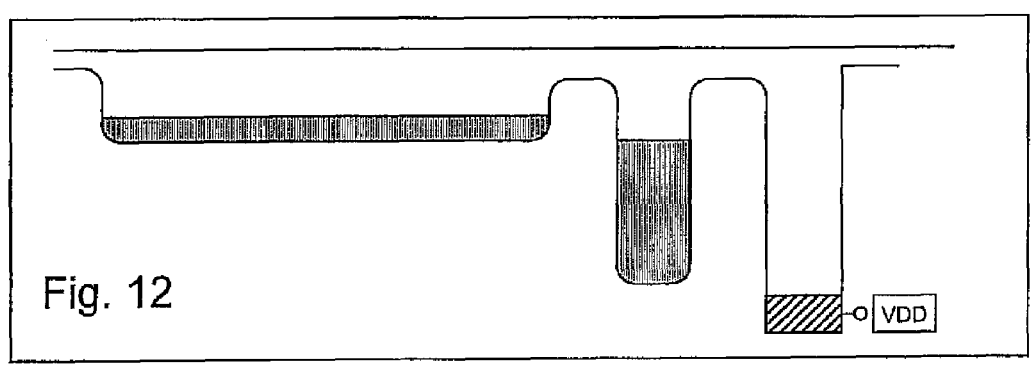

In accordance with FIG. 11 (Transfer 2), the control line TRS is set to a somewhat higher voltage of 2.8V by means of a second transfer control signal so that a second portion of the charge generated in the pinned diode 15 can flow into the readout node 41. Subsequently, the control line TRF is again set to 0V so that now the second portion of the charge is located in the readout node 41 (FIG. 12, end of Transfer 2).

Subsequently, the second switch 49B is closed. The voltage level of the readout node 41 caused by the second charge transfer is thereby guided via the converter FET 43 and the selection FET 47 to the column path 17 and thus to the part value capacitor 21B (Read Signal 2). After the system has undergone transient oscillation, the capacitor 21B is again separated from the pixel 11 by opening the second switch 49B so that an analog second part value voltage signal is stored in the part value capacitor 21B, said second part value voltage signal being proportional to the charge present in the readout node 41 after the second charge transfer.

Figure 13:
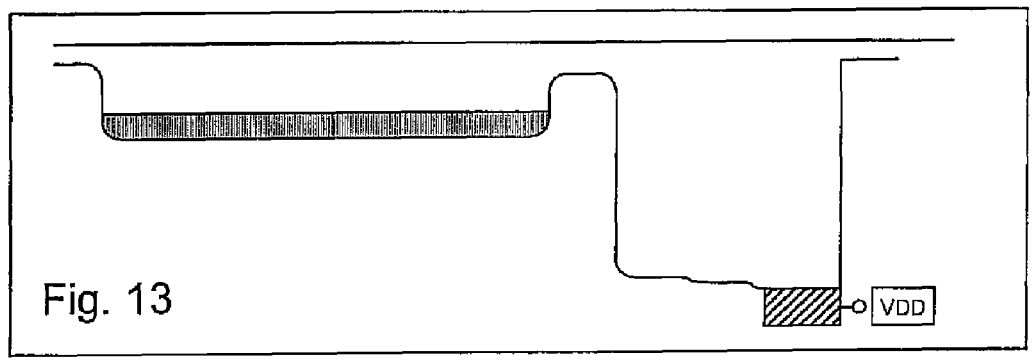
Figure 14:
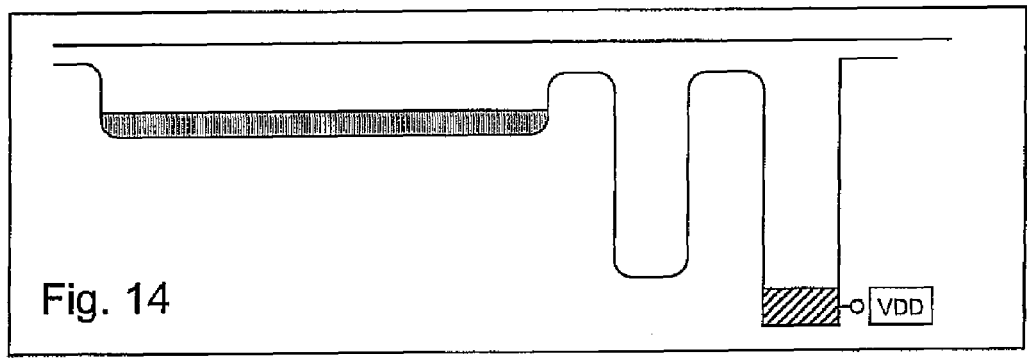

The control line RES is afterward set to a voltage of 3.3V so that the charge can flow off from the readout node 41 to the positive supply 51 (FIG. 13, Reset 3). The control line RES is then again set to 0V (FIG. 14, end of Reset 2). It is hereby ensured that the readout node 41 does not already contain charge before the generation of a reference value voltage signal as will be described in the following.

Subsequently—now without a repeat application of a transfer control signal to the control line TRF—the second switch 49E is closed. The voltage level of the readout node 41 is thereby switched via the converter FET 43 and the selection FET 47 to the column path 17 and is thus guided to the reference value capacitor 27 (Read Reference). After the system has undergone transient oscillation, the reference value capacitor 27 is separated from the pixel 11 again by opening the second switch 49E.

Figure 15:
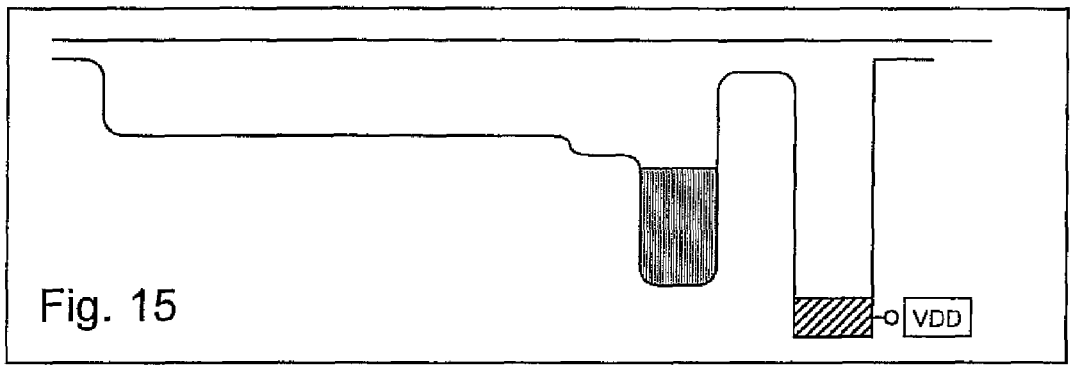
Figure 16:
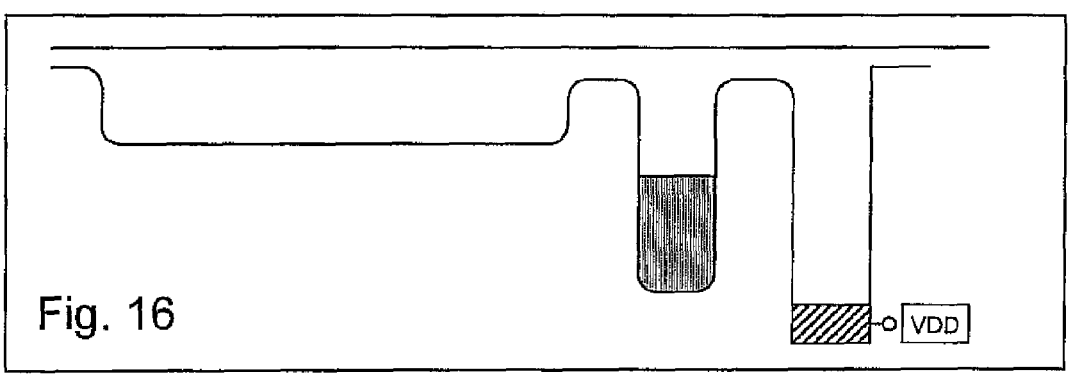

In a next step, the control line TRF is set to the full voltage of 3.3V by means of a third transfer control signal. The total residue of the charge generated in the pinned diode 15 can thereby flow into the read out node 41 (FIG. 15, Transfer 3). Subsequently, the control line TRF is again set to 0V so that now the third portion of the charge is located in the readout node 41 (FIG. 16, end of Transfer 3).

In a further step, the second switches 49C, 49D are then closed. The voltage level of the readout node 41 effected by the third charge transfer is thereby switched via the converter FET 43 and the selection FET 47 to the column path 17 and is thus guided both to the part value capacitor 21C and to the residual value capacitor 33. After the system has undergone transient oscillation, the part value capacitor 21C and the residual value capacitor 33 are again separated from the pixel 11 by opening the second switches 49C, 49D so that a respective analog third part value voltage signal is stored in the part value capacitor 21C and in the residual value capacitor, said third part value voltage signal being proportional to the charge present in the readout node 41 after the third charge transfer.

Figure 17:
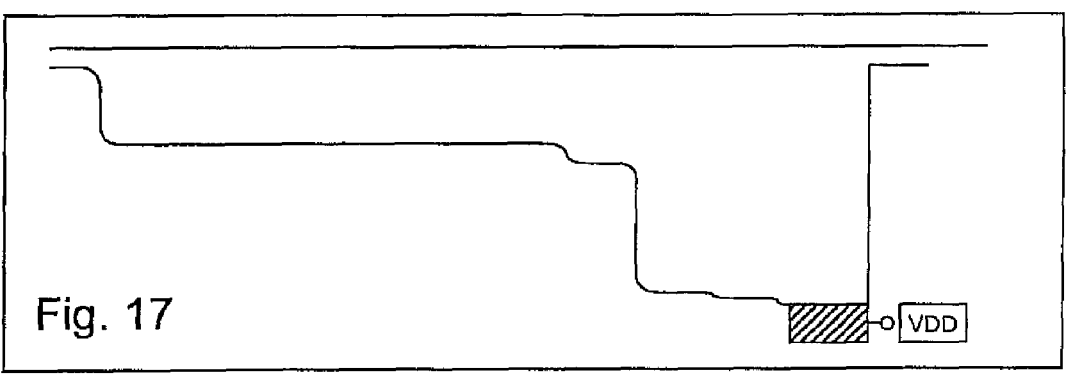

The control line SEL is then set to 0V again. The control lines RES and TRF are set to a voltage of 3.3V (FIG. 17, Reset 4). The charge located in the readout node 41 (and any residual charges located in the pinned diode 15) is (are) thereby removed. Subsequently, the control lines RES and TEF are again set to 0V (FIG. 18, end of Reset 4). The pixel is "empty" and the next exposure procedure can begin.

Finally, the first switches 23A, 23B, 23C are closed. The voltages LOW and HIGH, which are now applied to the amplifiers 19, 31, are guided to a common A/D converter or to separate A/D converters and digitized. By subtracting the reference value voltage signal, i.e. the voltage signal of the empty readout node 41, from the total value voltage signal (at the amplifier 19) or from the part value voltage signal of the third charge transfer (at the additional amplifier 31), less noise is achieved since the charge uncertainty (KTC noise) of the readout node 41 as well as all offset voltages are deducted.

It is also generally possible to carry out the two first readout procedures with the same voltage at TRF, e.g. 2.8V.

The voltage values of the transfer control signals are in particular adapted to the depth of the potential well of the pinned diode 15.

If the pinned diode 15 is filled by the respective exposure procedure to less than up to a level corresponding to the level of the potential barrier controlled by the transfer gate 39 on application of the second transfer control signal, in particular to less than up to a third, no charges are transferred from the pinned diode 15 to the readout node 41 on the first two readout procedures. The two part value capacitors 21A, 21B thus each contain the part value voltage signal of the "empty" readout node 41, i.e. the reference value voltage signal which is also stored in the reference value capacitor 27. The voltage HIGH at the output of the amplifier 19 therefore amounts to precisely a fraction to the amount of a third of the voltage LOW at the output of the additional amplifier 31. In this case, the voltage LOW is used for the determination of the charge generated in the pinned diode and HIGH is ignored.

It is a particular advantage of the invention that the aforesaid fraction (here: a third) is known precisely without calibration of the column amplifier circuit 13 since based on the integrated design of the capacitors 21A, 21B, 21C and 33 they can be provided with respective identical capacity.

If the pinned diode 15 is filled more than up to the aforesaid level, charges are transferred from the pinned diode 15 to the readout node 41 on at least two readout procedures, in particular at the three readout procedures. The capacitors 21B, 21C or 21A, 21B, 21C respectively thus include the corresponding part value voltage signals of the respective filled readout nodes 41. The voltage LOW at the output of the additional amplifier 31 is invalid in this case and will be ignored since it does not represent the total charge generated in the pinned diode 15. Consequently, in this case, only the voltage HIGH is used for the determination of the charge generated in the pinned diode 15.

With a high exposure at which a charge of more than, for example, 12,000 electrons is achieved in the pinned diode 15, a switch is therefore made to the signal HIGH at the output of the amplifier 19.

Either the signal HIGH or the signal LOW is thus selected for each pixel 11, with the ratio of the total capacity of the capacitors 21A, 21B and 21C to the capacity of the capacitor 33 being taken into account (signal HIGH corresponds to a third of the signal LOW with identical capacities). In a transitional region, both signals can also be taken into account, i.e. can be offset against one another (e.g. for a charge of 10,000 to 12,000 electrons in the pinned diode 15). The signals selected for the individual pixels 11 are finally combined to form a common image.

The dynamic range of the image sensor can hereby be increased with respect to an image sensor which only delivers this signal LOW.

In a preferred embodiment, the additional amplifier 31 (for the signal LOW) has a higher amplification factor (e.g. gain=4) than the named amplifier (e.g. gain=1 for the signal HIGH). The linear dynamic ratio is hereby increased. It is of advantage in this respect that the two amplifiers 19, 31 with the different amplification factors are arranged at the start of the signal path, i.e. the different amplification of the respective part value measurement signals takes place at a very "early" position in the signal processing path. The offsetting of the two signals against one another preferably takes place as late as possible in the signal processing path and separate A/D converters are provided.

FIG. 19 shows a further embodiment of the invention with a column amplifier circuit 13 simplified with respect to the embodiment in accordance with FIG. 2. The reading out of the pinned diode 15 generally takes place in an analog manner as described in connection with FIGS. 3 to 18, i.e. the charge generated during a single exposure procedure in the pinned diode 15 is transferred to the readout node 41 in a plurality of portions. The image sensor in accordance with FIG. 19 is, however, made such that the part value measurement signals corresponding to the charge transfers of a single exposure procedure are individually digitized and the digitized part value measurement signals are subsequently combined to form a digital total value measurement signal. For this purpose, in the example shown, only a single analog signal memory 21 is used in which the part value measurement signals and the reference value measurement signal are stored sequentially before they are each digitized by an A/D converter, not shown, which is connected after the amplifier 19.

The signal memory 21 can also be omitted if the respective measurement signal is digitized directly.

The invention claimed is:

1. An image sensor, in particular a CMOS image sensor, for electronic cameras,
   having a plurality of pixels (11) arranged in lines and columns, with the pixels (11) in each case comprising:
      a light-sensitive detector element (15) to generate electrical charge from incident light;
      a transfer gate (39);
      a readout node (41) which is charge coupled to the detector element (15) via the transfer gate (39);
      a converter circuit (43) to generate a measurement signal which is proportional to a charge present in the readout node (41); and
      a reset device (45) to reset a charge present in the readout node (41) to a reference value;
   and furthermore having a control device (53) for the control of the transfer gate (39) and of the reset device (45) of the respective pixel (11),
   wherein the control device (53) is configured such that the charge generated during a single exposure procedure in the respective detector element (15) is transferred from the detector element (15) to the readout node (41) in a plurality of portions,
   wherein the control device (53) is configured such that at least two sequential transfer control signals are applied to the transfer gate (39) for the reading out of the charge generated during a single exposure procedure in the respective detector element (15) so that a respective charge transfer from the detector element (15) to the readout node (14) is made possible in order to generate a separate part value measurement signal for each charge transfer by means of the converter circuit (43), said part value measurement signal being proportional to the charge present in the readout node (41) on the basis of the respective charge transfer,
   wherein at least two of the transfer control signals have different control values, and
   wherein the absolute value of the control value of the later of the two transfer control signals is larger than the absolute value of the control value of the earlier of the two transfer control signals.

2. An image sensor in accordance with claim 1, wherein the control device (53) is configured such that the reset device (45) is activated between the respective sequential transfer control signals.

3. An image sensor in accordance with claim 1, wherein the detector element (15) includes precisely two connections, with the one connection being coupled to a reference potential and the other connection only being coupled to the transfer gate (39).

4. An image sensor in accordance with claim 1, wherein the detector element (15) is made as a photodiode.

5. An image sensor in accordance with claim 1, wherein the readout node (41) is made as a floating diffusion.

6. An image sensor in accordance with claim 1, wherein the pixels (11) arranged in a respective column are connected via a common column path (17) to a column amplifier circuit (13) which is controllable by the control device (53) and which includes at least one amplifier (19) and a number of part value signal memories (21A, 21B, 21C) corresponding to the number of the sequential transfer control signals, with the control device (53) being configured such that each of the part value measurement signals corresponding to the charge transfers is transferred to a respective one of the part value signal memories (21A, 21B, 21C).

7. An image sensor in accordance with claim 6, wherein at least two part value signal memories (21A, 21B, 21C) are provided.

8. An image sensor in accordance with claim 6, wherein the part value signal memories (21A, 21B, 21C) have identical capacities and/or are made in integrated form.

9. An image sensor in accordance with claim 6, wherein the respective column amplification circuit (13) includes first switch means (23A, 23B, 23C), with the part value signal memories (21A, 21B, 21C) being simultaneously connectable via the first switch means (23A, 23B, 23C) to a first input (25) of the amplifier (19).

10. An image sensor in accordance with claim 9, wherein the control device (53) is made such that a reference value measurement signal corresponding to the reference value of the charge is generated by means of the converter circuit (43) after an activation of the reset device (45) and is transferred to a reference value signal memory (27) of the respective column amplifier circuit (13), with the reference value signal memory (27) being connected or connectable to a second input (29) of the amplifier (19).

11. An image sensor in accordance with claim 6, wherein the respective column amplifier circuit (13) includes an additional amplifier (31) and a residual value signal memory (33), with the control device (53) being made such that one of the part value measurement signals corresponding to the charge transfers is simultaneously transmitted to the associated part value signal memory (21C) and to the residual value signal memory (33).

12. An image sensor in accordance with claim 11, wherein the one part value measurement signal is that part value measurement signal which corresponds to the last charge transfer.

13. An image sensor in accordance with claim 11, wherein the respective residual value signal memory (33) is connected or connectable to a first input (35) of the additional amplifier (31).

14. An image sensor in accordance with claim 11, wherein a reference value signal memory (27) is connected or connectable to a second input (37) of the additional amplifier (31).

15. An image sensor in accordance with claim 11, wherein the additional amplifier (31) has a higher amplification factor than the at least one amplifier (19).

16. An image sensor in accordance with claim 6, wherein the respective column amplifier circuit (13) includes second switch means (49A, 49B, 49C, 49D, 49E), with the column path (17) being selectively connectable via the second switch means (23A, 23B, 23C) to one or more of the signal memories (21A, 21B, 21C, 27, 33).

17. An image sensor in accordance with claim 6, wherein the signal memories (21A, 21B, 21C, 27, 33) are each made as a capacitor.

18. An image sensor in accordance with claim 1, wherein the image sensor is made such that the part value measurement signals corresponding to the charge transfer of a single exposure procedure are individually digitized and the digitized part value measurement signals are subsequently combined to form a digital total value measurement signal.

19. A method for the reading out of an image sensor, in particular of a CMOS image sensor, for electronic cameras, wherein the image sensor includes a plurality of pixels (11) arranged in lines and columns, wherein
electrical charge generated by means of a light sensitive detector element (15) from incident light is transferred to a readout node (41) which is charge coupled to the detector element (15) via a transfer gate (39);
a measurement signal is generated by means of a converter circuit (43) and is proportional to a charge present in the readout node (41); and
a charge present in the readout node (41) is reset to a reference value by means of a reset device (45),
wherein the charge generated during a single exposure procedure in the respective detector element (15) is transferred from the detector element (15) to the readout node (41) in a plurality of portions,
wherein at least two sequential transfer control signals are applied to the transfer gate (39) for the reading out of the charge generated during a single exposure procedure in the respective detector element (15) so that a respective charge transfer from the detector element (41) to the readout node (14) is made possible in order to generate a separate part value measurement signal for each charge transfer by means of the converter circuit (41), said part value measurement signal being proportional to the charge present in the readout node (43) on the basis of the respective charge transfer,
wherein the pixels (11) arranged in a respective column are connected via a common column path (17) to a column amplifier circuit (13) which is controllable by the control device (53) and which includes at least one amplifier (19) and a number of part value signal memories (21A, 21B, 21C) corresponding to the number of the sequential transfer control signals, with each of the part value measurement signals corresponding to the charge transfers being transferred to a respective one of the part value signal memories (21A, 21B, 21C),
wherein the respective column amplifier circuit (13) includes an additional amplifier (13) and a residual value signal memory (33), with one of the part value measurement signals corresponding to the charge transfers being simultaneously transmitted to the associated part value signal memory (21C) and to the residual value signal memory (33), and
wherein the additional amplifier (31) has a higher amplification factor than the at least one amplifier (19).

20. A method in accordance with claim 19, wherein the reset device (45) is activated between the respective sequential transfer control signals.

21. A method in accordance with claim 19, wherein the respective column amplifier circuit (13) includes first switch means (23A, 23B, 23C), with the part value signal memories (21A, 21B, 21C) being simultaneously connected via the first switch means (23A, 23B, 23C) to a first input (25) of the amplifier (19).

22. A method in accordance with claim 21, wherein a reference value measurement signal corresponding to the reference value of the charge is generated by means of the converter circuit (43) after an activation of the reset device (45) and is transferred to a reference value signal memory (27) of the respective column amplifier circuit (13), wherein the reference value signal memory (29) is or is being connected to a second input (29) of the amplifier (19).

23. A method in accordance with claim 19, wherein the respective residual value signal memory (33) is or is being connected to a first input (35) of the additional amplifier (31) and/or a reference value signal memory (27) is or is being connected to a second input (37) of the additional amplifier (31).

24. A method in accordance with claim 19, wherein the respective column amplifier circuit (13) includes second switch means (49A, 49B, 49C, 49D, 49E), with the column path (17) being selectively connected via the second switch means (23A, 23B, 23C) to one or more of the signal memories (21A, 21B, 21C, 27, 33).

25. A method in accordance with claim 19, wherein the part value measurement signals corresponding to the charge transfers of a single exposure procedure are individually digitized and the digitized part value measurement signals are subsequently combined to form a digital total value measurement signal.

26. An image sensor, in particular a CMOS image sensor, for electronic cameras,
  having a plurality of pixels (11) arranged in lines and columns, with the pixels (11) in each case comprising:
    a light-sensitive detector element (15) to generate electrical charge from incident light;
    a transfer gate (39);
    a readout node (41) which is charge coupled to the detector element (15) via the transfer gate (39);
    a converter circuit (43) to generate a measurement signal which is proportional to a charge present in the readout node (41); and
    a reset device (45) to reset a charge present in the readout node (41) to a reference value;
  and furthermore having a control device (53) for the control of the transfer gate (39) and of the reset device (45) of the respective pixel (11),
  wherein the control device (53) is configured such that the charge generated during a single exposure procedure in the respective detector element (15) is transferred from the detector element (15) to the readout node (41) in a plurality of portions,
  wherein the control device (53) is configured such that at least two sequential transfer control signals are applied to the transfer gate (39) for the reading out of the charge generated during a single exposure procedure in the respective detector element (15) so that a respective charge transfer from the detector element (15) to the readout node (14) is made possible in order to generate a separate part value measurement signal for each charge transfer by means of the converter circuit (43), said part value measurement signal being proportional to the charge present in the readout node (41) on the basis of the respective charge transfer,
  wherein the pixels (11) arranged in a respective column are connected via a common column path (17) to a column amplifier circuit (13) which is controllable by the control device (53) and which includes at least one amplifier (19) and a number of part value signal memories (21A, 21B, 21C) corresponding to the number of the sequential transfer control signals, with the control device (53) being configured such that each of the part value measurement signals corresponding to the charge transfers is transferred to a respective one of the part value signal memories (21A, 21B, 21C),
  wherein the respective column amplifier circuit (13) includes an additional amplifier (31) and a residual value signal memory (33), with the control device (53) being made such that one of the part value measurement signals corresponding to the charge transfers is simultaneously transmitted to the associated part value signal memory (21C) and to the residual value signal memory (33), and
  wherein the additional amplifier (31) has a higher amplification factor than the at least one amplifier (19).

* * * * *